(12) United States Patent
Knott et al.

(10) Patent No.: US 7,754,778 B2
(45) Date of Patent: Jul. 13, 2010

(54) LINEAR POLYDIMETHYLSILOXANE-POLYOXYALKYLENE BLOCK COPOLYMERS LINKED VIA SI-C GROUPS AND VIA CARBOXYLIC ESTER GROUPS, A PROCESS FOR PREPARING THEM AND THEIR USE

(75) Inventors: Wilfried Knott, Essen (DE); Oliver Thum, Ratingen (DE); Klaus-Dieter Klein, Muelheim (DE); Dagmar Windbiel, Essen (DE); Claudia Hierath, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 217 days.

(21) Appl. No.: 12/179,944

(22) Filed: Jul. 25, 2008

(65) Prior Publication Data
US 2009/0030097 A1    Jan. 29, 2009

(30) Foreign Application Priority Data
Jul. 27, 2007    (DE) .................... 10 2007 035 646

(51) Int. Cl.
*C08G 77/06* (2006.01)
*C08G 77/04* (2006.01)
*C08J 9/00* (2006.01)

(52) U.S. Cl. .................... 521/112; 528/26
(58) Field of Classification Search ............. 521/112; 528/26
See application file for complete search history.

(56) References Cited

U.S. PATENT DOCUMENTS

| | | | | |
|---|---|---|---|---|
| 3,280,160 A | * | 10/1966 | Bailey | .................. 556/444 |
| 4,309,508 A | * | 1/1982 | Baskent et al. | ............. 521/112 |
| 4,814,409 A | * | 3/1989 | Blevins et al. | ................ 528/25 |
| 4,962,218 A | * | 10/1990 | Blevins et al. | .............. 556/445 |
| 5,525,640 A | * | 6/1996 | Gerkin et al. | ................ 521/112 |
| 5,789,454 A | * | 8/1998 | McVey | .................. 521/112 |
| 2004/0186260 A1 | | 9/2004 | Hohenberg et al. | |

* cited by examiner

*Primary Examiner*—Randy Gulakowski
*Assistant Examiner*—Robert Loewe
(74) *Attorney, Agent, or Firm*—Frommer Lawrence & Haug LLP

(57) ABSTRACT

The invention provides linear polydimethylsiloxane-polyoxyalkylene block copolymers containing Si—C groups and carboxylic ester groups and having repeating $(A^1BA^2B)$ units where $A^1$ and $A^2$ are two different polydimethylsiloxane units of the general formula (I)

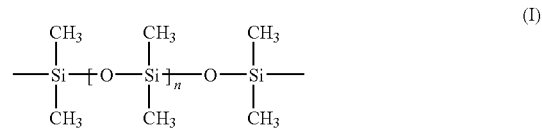

with a number of Si atoms $N=(n+2)$ of $15 \leq N \leq 30$ and $N_{A1} \neq N_{A2}$ and B is a unit of the formula (II) —$CH_2$—$CH_2$—$(CH_2)_a$—CO[O—$CH_2$—CH(R)]$_c$—O-[D-O]$_e$—[—$CH_2$—CH(R)—O]$_d$—OC—$(CH_2)_b$—$CH_2$—$CH_2$— (II) where R independently at each occurrence is H, —$CH_3$ or —$C_2H_5$, a and b independently of one another are 0 to 20, c and d independently of one another are values $\geq 1$, e is 0 or 1 and D is a hydrocarbon radical having 2 to 10 C atoms, the overall molar weight of the unit of the formula II being from 600 to 10 000 g/mol, with the proviso that the average mixed molar weight of the polydimethylsiloxane units $(A^1+A^2)$ is from >1665 to <1998 g/mol and the fraction of [O—$CH_2$—CH(R)] with R=H is >0% to $\leq 50\%$ by weight, based on the overall weight of [O—$CH_2$—CH(R)] in B, a process for preparing them and their use.

13 Claims, No Drawings

LINEAR POLYDIMETHYLSILOXANE-POLYOXYALKYLENE BLOCK COPOLYMERS LINKED VIA SI-C GROUPS AND VIA CARBOXYLIC ESTER GROUPS, A PROCESS FOR PREPARING THEM AND THEIR USE

This application claims benefit under 35 U.S.C. 119(a) of German patent application DE 10 2007 035 646.5, filed on 27 Jul. 2007.

Any foregoing applications, including German patent application DE 10 2007 035 646.5, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to linear polydimethylsiloxane-polyoxyalkylene block copolymers which are linked not only via SiC groups but also via carboxylic ester groups and which have repeating (AB) units, to a process for preparing them and to their use as stabilizers in flexible polyurethane foams.

In the course of the production of flexible polyurethane foams there are polysiloxane-polyoxy-alkylene block copolymers added to the mixture of raw materials, these copolymers having a variety of functions, including allowing the development of a uniform pore structure and stabilizing the foam that is formed until the reaction is at an end.

Not all polysiloxane-polyoxyalkylene block copolymers are equally suitable, however. To be used as polyurethane foam stabilizers, the polyoxyalkylene blocks and the polysiloxane block must be present in the block copolymers in a balanced proportion, and the structure of the two blocks is very important. For the structure of a foam stabilizer of maximum efficacy there are a multitude of variables, for both the polyoxyalkylene block and the polysiloxane block.

The polyoxyalkylene block may be composed of different oxyalkylene units, principally oxyethylene, oxy-propylene and oxybutylene units. Variation may be made in the weight ratio of these units to one another, in their sequence and also in the molar weight of the polyoxyalkylene block.

Also of importance is the end group of the polyoxyalkylene block, which in terms of polyurethane formation may be reactive (e.g. OH group) or inert (e.g. alkoxy group). The polyoxyalkylene block may be linked to the polysiloxane block through a hydrolytically stable Si—C bond or through the hydrolytically less stable SiO—C bond. It is also possible for different polyoxyalkylene blocks to be attached to the polysiloxane block.

The polysiloxane block can be varied with respect to the nature and proportion of the Si units. The siloxane block may be linear-chain or branched and may have varying molecular weight. The polyoxyalkylene blocks may be attached terminally and/or pendantly to the polysiloxane block.

Predictions concerning the efficacy of a polysiloxane-polyoxyalkylene block copolymer as a foam stabilizer can be made only to a limited extent, since the formulations vary greatly according to the technical use of the foams. The skilled person is therefore impelled to try out the possibilities for variation in a largely empirical way. In view of the large, virtually inestimable number of possible variations, the discovery of specific structural parameters which are particularly effective with regard to polyurethane production, and of corresponding block copolymers, is a task which requires vision and hence one whose fulfillment represents an inventive achievement.

There have been numerous previous descriptions of polysiloxane-polyoxyalkylene block copolymers containing different polyoxyalkylene units in the average molecule and containing either SiO—C— or Si—C bonding. The large number of corresponding publications include the following representative specifications: U.S. Pat. No. 3,920,587; U.S. Pat. No. 3,947,386; U.S. Pat. No. 6,187,891; DE-A-23 40 595; DE-C-22 10 934.

The SiO—C-based products are not stable to hydrolysis, a fact which is common knowledge.

The Si—C-based products, which are stable to hydrolysis, are presently prepared predominantly by hydrosilylation of allyl polyethers with polysiloxanes containing SiH groups. One unwanted side reaction in the hydrosilylation of allyl polyethers is their rearrangement to the propenyl polyethers which, although thermodynamically advantaged, are no longer capable of addition. For this reason the allyl component must be used typically in an excess of approximately 20% to 30% by weight. The hydrolysis of the propenyl polyether in the end product, triggered by traces of acids and by moisture, leads to the formation of propionaldehyde and its oligomers (aldoxanes, trioxanes), which emerge from the silicone polyether slowly over time and hence are responsible for its associated odour. The hydrolysis-unstable propenyl polyether acts here as a kind of reservoir, from which odorous substances are continuously formed.

Products for which odour neutrality is required must therefore undergo costly and inconvenient after-treatment (cf. JP-A-07304627; DE-A-41 16 419 (U.S. Pat. No. 5,225,509); EP-A-0 398 684 (U.S. Pat. No. 5,118,764)), which does not allow the problem to be solved satisfactorily and durably.

Examples of particularly sensitive indicators of deviations in the quality level are those polyethersiloxanes which are used as foam stabilizers, in the production of flexible PU foams. As technical parameters affecting the application, the activity and the cell fineness are criteria for assessing product quality. Product deviations therefore automatically affect technical performance in the application.

When α,ω-diallyl-modified polyethers are reacted with α,ω-dihydropolydimethylsiloxanes building SiC linkages, the excess of diallyl polyether that is needed in order to achieve quantitative SiH conversion, of approximately 20 to 40 mol %, results in a very short polyethersiloxane copolymer. The molecular weight which is achievable then depends critically on the molecular weight of the individual reactants.

The processes described in the prior art are therefore not suited to obtain polymers having relatively high degrees of polymerization. Copolymers prepared by the prior-art processes have on average only three siloxane blocks.

For a variety of applications, however, it is advantageous to use polysiloxane-polyoxyalkylene block copolymers of higher molecular weight. Thus, for example, block polyethersiloxane copolymers of low molecular weight are unsuitable as PU foam stabilizers, especially for flexible PU foams, more particularly for PU ether foams.

A further disadvantage of the processes described is that they are intolerant to even slight changes in the process parameters—i.e., changes of the kind which are normally unavoidable in industrial processes—and so the reproduction of different batches in line with specification is generally not guaranteed. Therefore, inevitably losses as a result of off-specification batches must be taken into account.

It was an object of the present invention to provide polysiloxane-polyoxyalkylene block copolymers which are suitable as PU foam stabilizers and which do not have one or more of the disadvantages of the polysiloxane-polyoxyalkylene block copolymers of the prior art.

Surprisingly it has now been found that specific (as defined in Claim 1) linear polydimethylsiloxane-polyoxyalkylene block copolymers, linked both via SiC groups and via carboxylic ester groups, are outstandingly suitable for stabilizing polyurethane foams, and more particularly for stabilizing flexible PU foams (PU ether foams).

Silicone polyether copolymers linked via carboxylic ester groups are compounds known per se and can be obtained by a variety of processes.

Thus the patent applications JP-A-08-157601 and US-A-2003-0096919 do describe the use of terminally unsaturated esters, but give no details concerning the preparation and, where appropriate, purification of these compounds. Considering that the platinum metal catalyzed hydrosilylation is a reaction which is highly sensitive to catalyst poisons, sometimes extensive purification steps are needed in order to obtain usable esters that can be readily reacted further with siloxanes.

A significantly improved access to the unsaturated carboxylic esters employed as intermediates is obtained through the synthesis carried out biocatalytically. The use of immobilized, i.e. supported, enzymes and enzyme complexes in the esterification reaction leads to intermediates which are free from disruptive contaminants and more particularly the catalyst poisons that later inhibit platinum metal catalysis.

By way of example, as taught by application DE-10 2006 005 100.9 (U.S. Pub. 2007-184006), α,ω-dihydroxyfunctional polyethers can be converted, by esterification with unsaturated carboxylic acids in the first stage and subsequent hydrosilylating SiC linkage with α,ω-dihydropolydimethylsiloxanes in the second stage, into carboxylic ester-bridged polydimethyl-siloxane-polyether block copolymers of high molecular weight. This procedure is also preferred for preparing the products of the invention. DE-10 2006 005 100.9 (U.S. Pub. 2007-184006) is therefore introduced here as a reference and is considered part of the disclosure content of the present invention.

In spite of their fundamentally positive properties, however, these carboxylic-ester-bridged, linear poly-dimethylsiloxane-polyether block copolymers do not possess overall suitability as stabilizers for flexible polyurethane foams, and more particularly not as stabilizers for elastic flexible polyurethane foams.

Surprisingly it has now been found that linear polydimethylsiloxane-polyoxyalkylene block copolymers containing Si—C groups and carboxylic ester groups and having repeating ($A^1BA^2B$) units where $A^1$ and $A^2$ are two different polydimethylsiloxane units of the general formula (I)

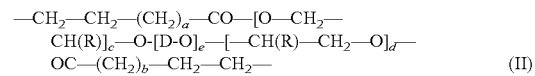
(I)

with a number of Si atoms N=(n+2) of $15 \leq N \leq 30$ and $N_{A1} \neq N_{A2}$ and B is a unit of the formula (II)

$$-CH_2-CH_2-(CH_2)_a-CO-[O-CH_2-CH(R)]_c-O-[D-O]_e-[-CH(R)-CH_2-O]_d-OC-(CH_2)_b-CH_2-CH_2-$$ (II)

where

R independently at each occurrence is H, —$CH_3$ or —$C_2H_5$, a and b independently of one another are 0 to 20, c and d independently of one another are values $\geq 1$, e is 0 or 1, and D is a hydrocarbon radical having 2 to 10 C atoms, the overall molar weight of the unit of the formula II being from 600 to 10 000 g/mol, with the proviso that the average mixed molar weight of the polydimethylsiloxane units ($A^1+A^2$) is from >1665 to <1998 g/mol, or the average chain length N of units A is from >22.5 to <27, preferably from 23<N<26, and the fraction of [O—$CH_2$—CH(R)] with R=H is >0% to $\leq$50% by weight, based on the overall weight of [O—$CH_2$—CH(R)] in B, represent excellent stabilizers for flexible polyurethane foams.

In one embodiment of the invention, c and d are independently of one another $\leq$120. In another embodiment of the invention, c and d are independently of one another from 5 to 50. In still another embodiment of the invention, c and d are independently of one another from 20 to 35.

The invention accordingly provides linear poly-dimethylsiloxane-polyoxyalkylene block copolymers which are linked via both Si—C groups and carboxylic ester groups and which have repeating ($A^1BA^2B$) units according to Claim 1.

Likewise provided by the present invention is a process according to Claim 6 for preparing polydimethyl-siloxane-polyoxyalkylene block copolymers which are linked via both SiC groups and carboxylic ester groups and which have repeating ($A^1BA^2B$) units.

Also provided by the present invention is the use of the polydimethylsiloxane-polyoxyalkylene block copolymers of the invention which have repeating ($A^1BA^2B$) units as additives for producing polyurethane ether foams.

Further subject matter not mentioned explicitly will emerge from the context of the description, examples and claims which follow.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

The block polyethersiloxane copolymers of the invention have the advantage that they are outstandingly suitable for stabilizing flexible PU foams, more particularly for PU ether foams.

The process of the invention for preparing block polyethersiloxane copolymers has the advantage of constituting an economically and environmentally advantageous process which allows linear and hydrolysis-stable, SiC-linked block polyether siloxane copolymers of high molecular mass, having improved stabilizer properties in flexible PU foams, to be prepared reliably and reproducibly.

The linear polydimethylsiloxane-polyoxyalkylene block copolymers of the invention, are linked via both Si—C groups and carboxylic ester groups and have repeating ($A^1BA^2B$) units, a process for preparing them and their use are described by way of example below, without any intention that the invention should be restricted to these exemplary embodiments. Where, in the text below, ranges, general formulae or classes of compounds are indicated, they should be taken to encompass not only the corresponding ranges or groups of compounds that are explicitly mentioned but also all subranges and sub-groups of compounds which can be obtained by extracting individual values (ranges) or compounds. Where the present description cites documents, their content should be considered as belonging in its entirety to the disclosure content of the present invention.

The linear polydimethylsiloxane-polyoxyalkylene block copolymers of the invention, containing Si—C groups and carboxylic ester groups, are distinguished by the fact that they contain repeating ($A^1BA^2B$) units where $A^1$ and $A^2$ are two different polydimethylsiloxane units of the general formula (I)

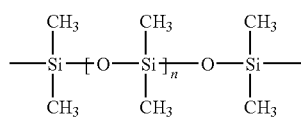

(I)

with an average number of Si atoms $N=(n+2)$ of $15 \leq N \leq 30$ and $N_{A1} \neq N_{A2}$ (number of Si atoms in the units $A^1$ and $A^2$ is not the same) and B is a unit of the formula (II)

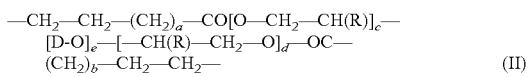

(II)

where
R independently at each occurrence is H, —$CH_3$ or —$C_2H_5$,
a and b independently of one another are 0 to 20, preferably 6 to 8,
c and d independently of one another are values $\geq 1$,
e is 0 or 1 and
D is a hydrocarbon radical, which may be linear or branched, having 2 to 10 C atoms,
the overall molar weight of the unit of the formula II (i.e. the number average molecular weight of the polyoxyalkylene block) being from 600 to 10000 g/mol, preferably 2000 to 5000 g/mol, more particularly 2500 to 3500 g/mol, wherein the number average molecular weight was determined by gel permeation chromatography (GPC))
with the proviso that the average mixed molar weight of the polydimethylsiloxane units ($A^1+A^2$) is from >1665 to <1998 g/mol, or the average chain length N of units A is from >22.5 to <27, preferably from 23<N<26, and the fraction of [O—$CH_2$—CH(R)] with R=H in B is from >0% to $\leq$50% by weight, preferably 30 to $\leq$50% by weight, based on the overall weight of [O—$CH_2$—CH(R)] in B.

In one embodiment of the invention, c and d are independently of one another $\leq$120. In another embodiment of the invention, c and d are independently of one another from 5 to 50. In still another embodiment of the invention, c and d are independently of one another from 20 to 35.

The technical products of the above-indicated formulae (I) or (II) may as a result of their production exhibit a certain degree of distribution in the molar masses. The indices in the formulae and N should therefore be regarded as average values.

The average mixed molar weight of the siloxane units is calculated from the respective mass fractions of the units $A^1$ and $A^2$.

$A^1$, $A^2$ and B in the formula ($A^1BA^2B$) represent the molecular fragments produced after the hydrosilylation reaction in the process described below, from the compounds $A^{1'}$ and $A^{2'}$ and B'.

The polydimethylsiloxane-polyoxyalkylene block copolymers of the invention may contain more than two units A. Thus, for example, the unit $A^2$ may be a mixture of units $A^{2a}$ and $A^{2b}$; additionally, the abovementioned conditions must be met, and the average mixed molar weight of all polydimethylsiloxane units A must be situated in the range from >1665 to <1998 g/mol. Polydimethylsiloxane-polyoxyalkylene block copolymers preferred in accordance with the invention contain just two different siloxane units $A^1$ and $A^2$.

The siloxane blocks $A^1$ and $A^2$ are obtained from technical products and represent linear siloxane polymer units having repeating siloxane building blocks which may be represented by the empirical formulae (—$R_2SiO$—)$_n^1$ and (—$R_2SiO$—)$_n^2$, with $n^1 \neq n^2$. The size of the individual different siloxane blocks may in each case vary arbitrarily within the defined limits, it being the case that, in view of the condition $N^1 \neq N^2$, $A^1 \neq A^2$ as well.

Polydimethylsiloxane-polyoxyalkylene block copolymers of the invention preferably contain as units A exclusively units $A^1$ with $N_A^1 \leq 20$, preferably 15 to 19, more preferably 15, and $A^2$ with $N_A^2 \geq 25$, preferably 26 to 30, more preferably 30.

The size of the individual oxyalkylene units (formula II) may be the same or different. The size of the oxyalkylene units of the formula (II) is preferably different within the limits defined above.

The individual polyoxyalkylene units of the formula II may be formed from the addition product of at least one oxyalkylene monomer selected from the group consisting of ethylene oxide, propylene oxide and butylene oxide, preferably mixed products of at least two monomer units, more particularly of ethylene oxide and propylene oxide. Polyoxyalkylene units of the formula II preferably contain oxyethylene and oxypropylene units, with an oxyethylene fraction of approximately 30% to <50% by weight and >50% to 70% by weight oxypropylene fraction, based on the total amount of oxyalkylene units in the polyoxyalkylene unit of the formula II.

The total fraction of siloxane units A, i.e. more particularly ($A^1+A^2$), in the polydimethylsiloxane-polyoxyalkylene block copolymer of the invention is preferably from 20% to 50% by weight, more preferably from 35% to 40% by weight. The fraction of the polyoxyalkylene blocks B, accordingly, is preferably from 50% to 80% by weight, more preferably from 60% to 65% by weight.

The polydimethylsiloxane-polyoxyalkylene block copolymer of the invention preferably has an average number-averaged molecular weight $M_n$ of at least 10000 g/mol to approximately 100000 g/mol, more preferably from 15000 g/mol to approximately 40000 g/mol. The average molar masses can be determined by means of the known methods of GPC analysis.

The polydimethylsiloxane-polyoxyalkylene block copolymers of the invention are more particularly obtainable by the process of the invention, described below, and can be obtained by the said process.

The process of the invention prepares SiC-linked, linear polydimethylsiloxane-polyoxyalkylene block copolymers having repeating (A$^1$BA$^2$B) units by reacting at least two different linear α,ω-dihydropolydimethyl-siloxanes (A') with at least one unsaturated polyetherdiol (B') containing ester groups, in the presence of one or more noble metal compounds as catalyst, where A': is at least two different α,ω-dihydropolydimethyl-siloxane compounds (A$^{1'}$ and A$^{2'}$) of the general formula (I')

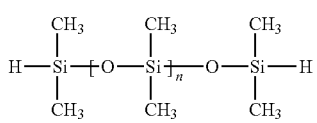

with a number of Si atoms N=(n+2) of 15≦N≦30 and N$_{A1}$≠N$_{A2}$,

B': is a compound of the formula (II')

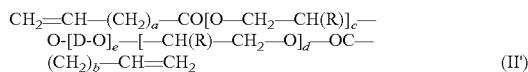

where

R at each occurrence is H, —CH$_3$ or —C$_2$H$_5$, preferably H or —CH$_3$, a and b independently of one another are 0 to 20, preferably 6 to 8, c and d independently of one another are values≧1, e is 0 or 1 and D is an unbranched or branched hydrocarbon radical having 2 to 10 carbon atoms, the overall molar weight of the polyether B' used being from 600 to 10000 g/mol, preferably 2000 to 5000 g/mol, more particularly 2500 to 3500 g/mol, with the provisos that the average mixed molar weight of the polydimethylsiloxane compounds (A$^{1'}$+A$^{2'}$) used is in the range>1665 to <1998 g/mol or the average chain length N of the compounds A' is from >22.5 to <27, preferably 21<N<26, and that the fraction of [O—CH$_2$—CH(R)] with R═H is >0% to ≦50% by weight, preferably from 30% to ≦50%, based on the overall polyether weight of [O—CH$_2$—CH(R)] in B'.

In one embodiment of the invention, c and d are independently of one another≦120. In another embodiment of the invention, c and d are independently of one another from 5 to 50. In still another embodiment of the invention, c and d are independently of one another from 20 to 35.

In the process of the invention it is possible to use more than two compounds A'. Thus, for example, the component A$^{2'}$ used may be, for example, a mixture of components A$^{2'a}$ and A$^{2'b}$, it being necessary, furthermore, for the conditions stated above to be met and for the average mixed molar weight of all polydimethylsiloxane compounds to be situated in the range>1665 to <1998 g/mol or for the average chain length N of all the compounds A' to be from >22.5 to <27, preferably 23<N<26.

In the process of the invention, however, there are preferably only two different siloxane components A$^{1'}$ and A$^{2'}$ used. With particular preference the process of the invention uses, as components A$^{1'}$ and A$^{2'}$, exclusively those siloxane compounds A$^{1'}$ with N$_A{}^{1'}$≦20, preferably 15 to 19, more preferably 15, and A$^{2'}$ with N$_A{}^{2'}$≧25, preferably 26 to 30, more preferably 30.

Polyoxyalkylene compounds (B') used are preferably those whose polyoxyalkylene blocks are obtainable by adding repeating oxyalkylene units [O—CH$_2$—CH(R)] to a starter diol of the general formula HO-[D-O]$_e$—H, in which D is an unbranched or branched hydrocarbon radical having 2 to 10 C atoms and e is 0 or 1. Obtainable in this way are diol components of the general formula

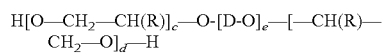

from which component B' can be prepared. The polyoxyalkylene blocks are preferably addition products of at least one oxyalkylene monomer selected from the group consisting of ethylene oxide, propylene oxide and butylene oxide, preferably mixed products of at least two monomer units, more particularly of ethylene oxide and propylene oxide.

The compounds B' employed may be prepared preferably, as described in DE-10 2006 005 100.9, by condensing the corresponding alcohols and acids using at least one enzyme as catalyst. Instead of the acids it is also possible to use the corresponding esters of the carboxylic acids with volatile alcohols for a transesterification: examples of those suitable include methyl, ethyl or vinyl esters.

The enzymes which can be used as catalysts are preferably those from the group of the hydrolytic enzymes, such as lipases, esterases or proteases, such as, for example, cholesterol esterase, esterase from porcine liver or lipases from *Candida rugosa, Pseudomonas* sp., *Thermomyces langosiosus*, porcine pancreas, *Mucor miehei, Alcaligines* sp., preferably lipases, more preferably lipase B from *Candida antarctica*. As a catalyst it is preferred to use the lipase B enzyme from *Candida antarctica* which is available under the product name Novozym® 435 from Novozymes Deutschland GmbH.

The catalysts used can be whole cells, resting cells, immobilized cells, purified enzymes or cell extracts containing the corresponding enzymes, or mixtures of these. In accordance with the invention the enzymes can be used in whole-cell systems, in free form or immobilized on suitable supports.

The catalysts are used preferably in amounts of approximately 0.1% to approximately 10.0% by weight, preferably 1.0% to 5.0% by weight, based on the reaction mixture intended for transesterification or esterification. The molar ratio of alcohols to acids is preferably in the region of equivalence.

The unsaturated acids used to esterify the diol component of the general formula H[O—CH$_2$—CH(R)]$_c$—O-[D-O]$_e$—[—CH(R)—CH$_2$—O]$_d$—H may be one or more compounds of the general formula CH$_2$═CH—(CH$_2$)$_a$—COOR, where R is H or a C$_{1-5}$ alkyl radical and a is as indicated above, preferably selected from the group consisting of acrylic acid, 1-butenoic acid, 1-pentenoic acid, 1-hexenoic acid, 1-heptenoic acid, 1-octenoic acid, 1-nonenoic acid, 1-decenoic acid and undecylenic acid. As the unsaturated acid it is preferred to use undecylenic acid alone or in mixtures with acrylic acid.

For the preparation of the compound B' the reactants can be mixed in a suitable reactor (e.g. round-bottomed flask with stirrer, or in a fixed-bed reactor) and heated to the optimum working temperature of the biocatalyst used. Depending on the biocatalyst used, this working temperature may be from 20° C. to 100° C., preferably from 35° C. to 80° C. When using a fixed-bed reactor the fixed bed is preferably charged with the selected enzyme and, after the reaction temperature has been reached, the reaction mixture is pumped through the fixed bed. In the absence of a fixed-bed reactor the enzyme can be added to the reaction mixture directly and is isolated by filtration, using suitable devices, after the end of the reaction. In order to achieve conversions as near to completion as possible, the water or low-boiling alcohol released during the reaction may advantageously be removed by application of a vacuum and/or by means of other suitable techniques, such as by the passing of inert gases (e.g. nitrogen) through the mixture, or the use of absorbents (e.g. molecular sieve).

Subsequently the resulting esters, where appropriate also as a mixture with one another and/or with other, terminally unsaturated organic compounds, examples being allyloxyethanol, glycerol monoallyl ether, allyltrimethylolpropane, α-olefins or terminally unsaturated polyethers, preferably exclusively the esters of the formula B', can be reacted with a linear polydimethylsiloxane A' containing terminal SiH groups, in order to give the polydimethylsiloxane-polyoxyalkylene block copolymers of the invention.

The inventive reaction of the compounds A' with the compound or compounds B' may be carried out, for example, in accordance with the hydrosilylation process known per se.

The reaction of the compounds A' with the compound B' by hydrosilylation for preparing the polydimethyl-siloxane-polyoxyalkylene block copolymers of the invention may be accomplished, selectively, with or without the use of a suitable solvent. Where the aim is for SiC-linked copolymers of high molecular weight and hence of high viscosity, it may be advantageous, in order to improve the handling properties, to carry out the reaction in a suitable solvent. Examples of suitable solvents are alkanes, cycloalkanes, alkylaromatics and the like, particular preference being given to high-boiling solvents with boiling points>120° C.

The reactants, composed of at least one unsaturated polyether component B' and at least two different α,ω-hydrosiloxanes, where appropriate with inclusion of a solvent, may in principle be introduced together with intimate mixing at an elevated temperature, and brought to reaction by addition of a sufficient amount of a noble metal catalyst customary in the art for this reaction, preferably selected from the group consisting of platinum catalysts, or else may be supplied sequentially to the reaction. In that case, particular preference is given to a regime in which at least one of the components B' is introduced in a high-boiling solvent at an elevated temperature, initially with a small amount of the catalyst used in the reactor, and this mixture is then admixed with the α,ω-hydrosiloxanes A' at a controlled metering rate, with thorough mixing.

The molar ratio of α,ω-hydrosiloxanes A (more particularly $A^{1'}+A^{2'}$) to unsaturated polyether components B' in the reaction in the process of the invention is preferably from 0.9:1 to 1.1:1, preferably approximately 1:1.

As noble metal catalysts it is possible with preference to use the ethylene-activated Karstedt catalysts known from EP-A-1 520 870 (U.S. Pat. No. 7,157,541). The noble metal catalysts are used preferably in amounts of approximately $1 \cdot 10^{-4}\%$ to approximately $1 \cdot 10^{-2}\%$, preferably $3 \cdot 10^{-4}\%$ to $5 \cdot 10^{-3}\%$ by weight, based on the sum of the hydrosiloxanes A' and polyethers B' introduced.

The temperature for the reaction of the components A' and B' for preparing the copolymers of the invention ought preferably to be from 60° C. to 140° C., more preferably from 80° C. to 120° C.

The SiC-linked, linear polydimethylsiloxane-polyoxyalkylene block copolymers of the invention can be used as additives, more particularly as interface-active additives, with particular preference as stabilizers for producing flexible polyurethane foams, more particularly elastic flexible polyurethane foams, and with particular preference polyurethane ether foams.

The examples set out below describe the present invention by way of example, without the invention—whose scope for application is apparent from the entire description and the claims—being restricted to the embodiments specified in the examples.

PREPARATION EXAMPLE FOR THE STARTING SUBSTANCE

Enzymatic Reaction of a Polyetherdiol with 10-Undecenoic Acid (According to DE-10 2006 005 100.9)

In a 4 l multi-necked flask, 1829.9 g (0.7 mol) of an α,ω-dihydroxypoly(ethylene oxide-propylene oxide) copolymer having a hydroxyl number of 41.5 (mg KOH)/g with 50% by mass propylene oxide content and with ethylene oxide end blocks were heated with 249.4 g (1.4 mol) of undecenoic acid (molar mass: 184.3 g/mol, acid number: 304.4 mg KOH/g) to 70° C. with stirring and then 41.6 g of Novozym® 435 (2% by mass based on the total batch) were added. At 4 mbar and with further continual stirring, and also with the introduction of a gentle stream of nitrogen (~2000 ml/h), the reaction mixture was reacted for 23 hours. During this time the initial acid number of the reaction mixture fell from originally 35.8 mg KOH/g solids to 1.4 mg KOH/g solids. Following filtration and 2-hour heat treatment at 120° C., the α,ω-bis-undecenoato-poly(ethylene oxide-propylene oxide) copolymer was ready for use for the subsequent reactions.

EXAMPLES 1 TO 13

The preparation of all of the linear silicone polyether copolymers listed in Table 2 below is accomplished via hydrosilylation, and the examples 4, 6, 7, 11, 12 and 13 described in detail below are representative of the experimental procedure also practiced for experiments 1 to 3, 5 and 8 to 10.

EXAMPLE 4

Comparative

A 500 ml four-necked flask with KPG stirrer, contact thermometer and reflux condenser was charged with 40 mmol of the α,ω-bis-undecenoato-poly(ethylene oxide-propylene oxide) copolymer prepared enzymatically above and with 40 mmol of an α,ω-dihydropolydimethylsiloxane of average chain length N=22.5, in the form of a 50% strength by mass mixture in a linear alkylbenzene (Hyblene 113, Sasol), at 90° C. with intimate mixing, and then 5 ppm by mass of Pt, based on the overall batch, of a WK catalyst (i.e., of an ethylene-activated Karstedt catalyst according to EP-1 520 870) were added. After 6 hours the SiH conversion as determined by gas volumetry was quantitative.

The use of the copolymer thus prepared, after 14-day storage at 70° C., as a stabilizer in the production of a flexible polyurethane foam led to shrinkage.

EXAMPLE 6

Comparative

A 500 ml four-necked flask with KPG stirrer, contact thermometer and reflux condenser was charged with 40 mmol of the polyetherdiol (α,ω-bis-undecenoato-poly(ethylene oxide-propylene oxide)copolymer) esterified enzymatically above, together with 10 mmol of an α,ω-dihydropolydimethylsiloxane of average chain length N=15 and also with 30 mmol of an α,ω-dihydropolydimethylsiloxane of average chain length N=20, as a 50% by mass mixture in a linear alkylbenzene (Hyblene 113, Sasol), with thorough stirring, and this initial charge was heated to 90° C. and then 5 ppm by mass of Pt, based on the overall batch, of a WK catalyst (i.e., of an ethylene-activated Karstedt catalyst according to EP-1 520 870) were added. The average chain length of the hydrosiloxanes used here was N=18.75. After a reaction time of 5 hours the SiH conversion as determined by gas volumetry reached 99.0% (decomposition of an aliquot sample with butylate solution in a gas burette).

An application test based up on foaming using the copolymer stored at 70° C. for 14 days as a flexible PU foam stabilizer led to the finding of significant shrinkage.

EXAMPLE 7

Comparative

In the same way as in Example 4, 40 mmol of the polyetherdiol (α,ω-bis-undecenoato-poly(ethylene oxide-propylene oxide)copolymer) esterified enzymatically above, were charged together with 20 mmol of an α,ω-dihydropolydimethylsiloxane of average chain length N=15 and also with 20 mmol of an α,ω-hydrosiloxane of average chain length N=30, as a 50% by mass mixture in a linear alkylbenzene (Hyblene 113, Sasol), with thorough mixing, and this initial charge was heated to 90° C. and then 5 ppm by mass of Pt, based on the overall batch, of a WK catalyst (i.e., of an ethylene-activated Karstedt catalyst according to EP-A-1 520 870) were added. The calculated chain length of the mixture of hydrosiloxanes used here was N=22.5. After 4 hours, gas-volumetric analysis indicated more than 99.1% reaction of the SiH groups.

An application test based up on foaming using the copolymer stored at 70° C. for 14 days as a flexible PU foam stabilizer led to the finding of significant shrinkage.

EXAMPLE 11

Inventive

In the same way as in Example 4, 36 mmol of the polyetherdiol (α,ω-bis-undecenoato-poly(ethylene oxide-propylene oxide)copolymer) esterified enzymatically above, were charged together with 12 mmol of an α,ω-dihydropolydimethylsiloxane of average chain length N=15 and also with 24 mmol of an α,ω-hydrosiloxane of average chain length N=30, as a 50% by mass mixture in a linear alkylbenzene (Hyblene 113, Sasol), with thorough mixing, and this initial charge was heated to 90° C. and then 5 ppm by mass of Pt, based on the overall batch, of a WK catalyst (i.e., of an ethylene-activated Karstedt catalyst according to EP-A-1 520 870) were added. The calculated average chain length of the mixture of hydrosiloxanes used here was N=25. After 4 hours the SiH conversion as determined by gas volumetry was quantitative.

An application test based up on foaming using the copolymer stored at 70° C. for 14 days as a flexible PU foam stabilizer led to an attractive, open-cell foam.

EXAMPLE 12

Inventive

In the same way as in Example 4, 36 mmol of the polyetherdiol (α,ω-bis-undecenoato-poly(ethylene oxide-propylene oxide)copolymer) esterified enzymatically above, were charged together with 9 mmol of an α,ω-dihydropolydimethylsiloxane of average chain length N=15 and also with 27 mmol of an α,ω-hydrosiloxane of average chain length N=30, as a 50% by mass mixture in a linear alkylbenzene (Hyblene 113, Sasol), with thorough mixing, and this initial charge was heated to 90° C. and then 5 ppm by mass of Pt, based on the overall batch, of a WK catalyst (i.e., of an ethylene-activated Karstedt catalyst according to EP-A-1 520 870) were added.

The calculated average chain length of the mixture of hydrosiloxanes used here was N=26.25. After 3 hours the SiH conversion as determined by gas volumetry was quantitative.

An application test based up on foaming using the copolymer stored at 70° C. for 14 days as a flexible PU foam stabilizer led to an attractive, open-cell foam.

EXAMPLE 13

Comparative

In the same way as in Example 4, 40 mmol of the polyetherdiol (α,ω-bis-undecenoato-poly(ethylene oxide-propylene oxide)copolymer) esterified enzymatically above, were charged together with 10 mmol of an α,ω-dihydropolydimethylsiloxane of average chain length N=20 and also with 30 mmol of an α,ω-dihydropoly-dimethylsiloxane of average chain length N=30, as a 50% by mass mixture in a linear alkylbenzene (Hyblene 113, Sasol), with thorough stirring, and this initial charge was heated to 90° C. and then 5 ppm by mass of Pt, based on the overall batch, of a WK catalyst (i.e., of an ethylene-activated Karstedt catalyst according to EP-1 520 870) were added. The average chain length of the mixture of α,ω-dihydropolydimethylsiloxanes used here was N=27.5.

After 6 hours the SiH conversion as determined by gas volumetry was quantitative.

An application test based up on foaming using the copolymer stored at 70° C. for 14 days as a flexible PU foam stabilizer led to the finding of a foam collapse.

USE EXAMPLES

Testing of the Resulting
Polydimethylsiloxane-Polyoxyalkylene Block
Copolymers as Foam Stabilizers All of the polyethersiloxanes prepared in the examples were foamed after having been stored for 14 days at 70° C. These conditions take account of the practical relevance in the polyurethane industry, in the sense that the transit conditions of global supply may entail such storage times and storage temperatures.

The performance test used a typical ether foam formulation whose composition was like that shown in Table 1:

TABLE 1

Composition of the ether foam formulation:

| Parts by weight | Ingredients |
|---|---|
| 0.07 | Kosmos ® 29 (tin(II) 2-ethylhexanoate) from Goldschmidt GmbH |
| 30 | Polyol CP 3322 (commercial polyol from DOW) |
| 70 | Polyol CP 755 (commercial polyol from DOW) |
| 7 | Polyol CP 1421 (commercial polyol from DOW) |
| 1.95 | Water |
| 0.2 | Tegoamin ® BDE (bis(dimethylaminoethyl) ether solution) from Goldschmidt GmbH |
| 0.3 | Tegoamin ® 33 (triethylenediamine solution) |
| 0.2 | Tegoamin ® DMEA (dimethylethanolamine solution) |
| 1.2 | The foam stabilizer under test |
| 40.3 | Tolylene diisocyanate (TDI 80) (corresponding to an index of 85) |

The tin catalyst tin(II) 2-ethylhexanoate, the three polyols, the water and the three amine catalysts were placed in a paper cup and mixed for 60 s with a disc stirrer at 1000 rpm. Subsequently the isocyanate was added and incorporated using the same stirrer at 1500 rpm for 7 s. At this point the mixture in the cup began to foam. It was therefore poured into a foaming box immediately after stirring was at an end. This box had a basal area of 17×17 cm and a height of 30 cm. External PU foam insulation 5 cm thick prevented excessively rapid cooling. Internally the box was designed with a plastic film in order to allow the cured foam to be removed subsequently. After the material had been poured into the foaming box, the foam rose. Ideally, gas pressure in the foam reduced when the maximum rise height was reached, and the foam then relaxed slightly. In this case the cell membranes of the foam bubbles opened, and an open-pore cell structure was obtained in the foam. In the case of inadequate stabilization, the PU foam collapsed before the maximum rise height was reached. In the event of excessive stabilization, the foam rose for a very long time and there was no reduction in gas pressure. Owing to the very closed cell structure in that case, the foam underwent shrinkage in the course of subsequent cooling as a result of the volume contraction of the gas as it cooled. The results of the foaming for the various formulations are shown in Table 2.

TABLE 2

Results of the foamings of the reaction products of the above-described use examples:

| Number of experiment Example | α,ω-Hydrosiloxane Chain lengths used | Molar ratio | Chain length[a] | Foaming after 14-day storage at 70° C. |
|---|---|---|---|---|
| 1 | N = 15 | | 15 | shrinkage |
| 2 | N = 30 | | 30 | collapse |
| 3 | N = 20 | | 20 | shrinkage |
| 4 | N = 22.5 | | 22.5 | shrinkage |
| 5 | N = 25 | | 25 | shrinkage |
| 6 | N = 15/ N = 20 | 1/3 | 18.75[a] | shrinkage |
| 7 | N = 15/ N = 30 | 1/1 | 22.5[a] | shrinkage |
| 8 | N = 20/ N = 30 | 3/1 | 22.5[a] | shrinkage |
| 9 | N = 20/ N = 30 | 2/1 | 23.3[a] | open |
| 10 | N = 20/ N = 30 | 1/1 | 25[a] | open |
| 11 | N = 15/ N = 30 | 1/2 | 25[a] | open |
| 12 | N = 15/ N = 30 | 1/3 | 26.25[a] | open |
| 13 | N = 20/ N = 30 | 1/3 | 27.5[a] | collapse |

[a] Average siloxane mixed chain lengths

FINDINGS FOR EXAMPLES 1 AND 3 TO 8

Comparative

The foam rose and there was no reduction in gas pressure. Instead, the foam rose for a long time (>3 min). In the course of subsequent cooling there was severe shrinkage of the foam. Because of the shrinkage, the physical properties could not be measured. The foam stabilizer of this example was unsuitable for producing an ether foam.

OBSERVATIONS IN THE CASE OF EXAMPLES 2 AND 13

Comparative

The foam rose very unevenly and collapsed well before reaching the maximum rise height expected in the case of effective stabilization.

OBSERVATIONS IN THE CASE OF EXAMPLES 9 TO 12

Inventive

The foam rose, the gas pressure reduced after about 2 min, the foam relaxed slightly, but did not change further in the course of subsequent cooling. In the case of the subsequent investigation, a cell count of 10 cells/cm and a porosity of 70 mm were measured (measurement of backpressure, by determining the height of a water column generating an equivalent pressure) This shows that the cell structure is sufficiently fine and open (foams are referred to as closed when the water column is 300 mm or more). The foam had the desired ether foam properties. The foam stabilizer of the inventive examples is therefore suitable for the production of this type of foam.

Having thus described in detail various embodiments of the present invention, it is to be understood that many apparent variations thereof are possible without departing from the spirit or scope of the present invention.

The invention claimed is:

1. Linear polydimethylsiloxane-polyoxyalkylene block copolymers containing Si—C groups and carboxylic ester groups and having repeating ($A^1BA^2B$) units where $A^1$ and $A^2$ are two different polydimethyl-siloxane units of the general formula (I)

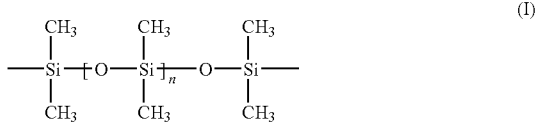
(I)

with a number of Si atoms N=(n+2) of $15 \leq N \leq 30$ and $N_{A1} \neq N_{A2}$
and B is a unit of the formula (II)

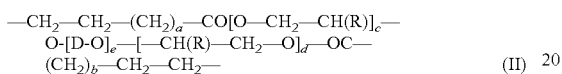
(II)

where
R independently at each occurrence is H, —$CH_3$ or —$C_2H_5$,
a and b independently of one another are 0 to 20,
c and d independently of one another are values $\geq 1$,
e is 0 or 1,
D is a hydrocarbon radical having 2 to 10 carbon atoms,
the overall molar weight of the unit of the formula II being from 600 to 10000 g/mol,
with the proviso that the average mixed molar weight of the polydimethylsiloxane units ($A^1+A^2$) is from >1665 to <1998 g/mol and the fraction of [O—$CH_2$—CH(R)] with R=H is >0% to $\leq$50% by weight, based on the overall weight of [O—$CH_2$—CH(R)] in B.

2. Polydimethylsiloxane-polyoxyalkylene block copolymers according to claim 1, characterized in that exclusively units $A^1$ with $N \leq 20$ and $A^2$ with $N \geq 25$ are present.

3. Polydimethylsiloxane-polyoxyalkylene block copolymers according to claim 2 characterized in that:
the unit of the formula II has an average molar mass of 2000 to 5000 g/mol;
the unit of the formula (II) has a fraction of [O—$CH_2$—CH(R)] with R=H of 30% to $\leq$50% by weight, based on the overall weight of [O—$CH_2$—CH(R)] in B; and
the polydimethylsiloxane-polyoxyalkylene block copolymer has an average number-averaged molecular weight $M_n$ of at least 10000 g/mol to approximately 100000 g/mol.

4. Polydimethylsiloxane-polyoxyalkylene block copolymers according to claim 1, characterized in that the unit of the formula II has an average molar mass of 2000 to 5000 g/mol.

5. Polydimethylsiloxane-polyoxyalkylene block copolymers according to claim 1, characterized in that the unit of the formula (II) has a fraction of [O—$CH_2$—CH(R)] with R=H of 30% to $\leq$50% by weight, based on the overall weight of [O—$CH_2$—CH(R)] in B.

6. Polydimethylsiloxane-polyoxyalkylene block copolymers according to claim 1, characterized in that the polydimethylsiloxane-polyoxyalkylene block copolymer has an average number-averaged molecular weight $M_n$ of at least 10 000 g/mol to approximately 100 000 g/mol.

7. A method for stabilizing a polyurethane foam which comprises adding the SiC-linked, linear polydimethylsiloxane-polyoxyalkylene block copolymers according to claim 1 to a polyurethane foam.

8. The method of claim 7, wherein the polyurethane foam is a polyurethane ether foam.

9. Process for preparing the linear poly-dimethylsiloxane-polyoxyalkylene block copolymers of claim 1 which comprises reacting at least two different linear α,ω-dihydropolydimethylsiloxanes A' with at least one unsaturated polyetherdiol (B') containing ester groups, in the presence of one or more noble metal compounds as catalyst, where
A' is at least two different α,ω-dihydropolydimethylsiloxane compounds ($A^{1'}$ and $A^{2'}$) of the general formula (I')

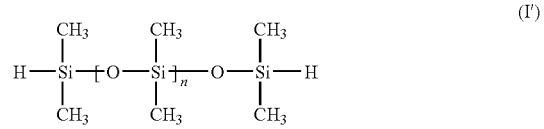
(I')

with a number of Si atoms N=(n+2) of $15 \leq N \leq 30$ and $N_{A1} \neq N_{A2}$,
B' is

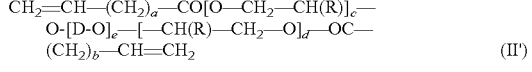
(II')

where
R at each occurrence is H, —$CH_3$ or —$C_2H_5$,
a and b independently of one another are 0 to 20,
e is 0 or 1,
c and d independently of one another are values $\geq 1$ and
D is a hydrocarbon radical having 2 to 10 C atoms,
the overall molar weight of the polyether B' being from 600 to 10000 g/mol,
with the provisos that the average mixed molar weight of the polydimethylsiloxane compounds ($A^{1'}+A^{2'}$) is from >1665 to <1998 g/mol and that the fraction of [O—$CH_2$—CH(R)] with R=H is >0% to $\leq$50% by weight, based on the overall polyether weight of [O—$CH_2$—CH(R)] in B'.

10. The process according to claim 9, characterized in that exclusively compounds $A^{1'}$ with $N \leq 20$ and $A^{2'}$ with $N \geq 25$ are used as compounds of the formula (I').

11. The process according to claim 10, characterized in that as component B' a compound of the formula (II') is used which has an average molar mass of 2000 to 5000 g/mol; and
that a compound of the formula (II') is used which has a fraction of [O—$CH_2$—CH(R)] with R=H of 30% to $\leq$50% by weight, based on the overall weight of [O—$CH_2$—CH(R)] in B'.

12. The process according to claim 9, characterized in that as component B' a compound of the formula (II') is used which has an average molar mass of 2000 to 5000 g/mol.

13. The process according to claim 9, characterized in that a compound of the formula (II') is used which has a fraction of [O—$CH_2$—CH(R)] with R=H of 30% to $\leq$50% by weight, based on the overall weight of [O—$CH_2$—CH(R)] in B'.

* * * * *